(12) United States Patent
Marlett et al.

(10) Patent No.: US 9,309,823 B2
(45) Date of Patent: Apr. 12, 2016

(54) EXHAUST GAS RECIRCULATION COOLER PROTECTION SYSTEM AND METHOD

(71) Applicant: GM GLOBAL TECHNOLOGY OPERATIONS LLC, Detroit, MI (US)

(72) Inventors: Chad E. Marlett, Plymouth, MI (US); Kevin J. McKay, New Hudson, MI (US); Yun Xiao, Ann Arbor, MI (US); Steve L Melby, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 278 days.

(21) Appl. No.: 14/153,401

(22) Filed: Jan. 13, 2014

(65) Prior Publication Data

US 2015/0198105 A1 Jul. 16, 2015

(51) Int. Cl.
*F02M 25/07* (2006.01)
*F02D 41/00* (2006.01)

(52) U.S. Cl.
CPC ........... *F02D 41/0065* (2013.01); *F02M 25/07* (2013.01); *F02M 25/0702* (2013.01); *F02D 2200/021* (2013.01); *F02D 2200/0414* (2013.01); *F02D 2200/101* (2013.01); *F02D 2200/1002* (2013.01); *F02D 2200/501* (2013.01)

(58) Field of Classification Search
CPC ................... F02M 25/0707; F02M 2025/0726
USPC .......................... 123/568.11, 568.21–568.24, 123/568.29–568.31
See application file for complete search history.

(56) References Cited

U.S. PATENT DOCUMENTS

| | | | | |
|---|---|---|---|---|
| 2003/0187567 A1* | 10/2003 | Sulatisky | .................. | F01N 3/20 701/104 |
| 2006/0075740 A1* | 4/2006 | Twigg | ................ | B01D 53/9445 60/285 |
| 2007/0214777 A1* | 9/2007 | Allansson | .............. | B01D 53/90 60/299 |
| 2009/0007888 A1* | 1/2009 | Sarlashkar | ............ | F02D 35/026 123/478 |
| 2009/0211229 A1* | 8/2009 | Andreae | ................ | F02D 41/005 60/274 |
| 2010/0023292 A1* | 1/2010 | Willard | .................... | G07C 5/08 702/89 |
| 2011/0120086 A1* | 5/2011 | Gidney | .............. | B01D 53/9431 60/274 |
| 2013/0312708 A1* | 11/2013 | Kuriyama | ............... | F02D 41/00 123/478 |

* cited by examiner

*Primary Examiner* — John Kwon
(74) *Attorney, Agent, or Firm* — Quinn Law Group, PLLC (57) ABSTRACT

A system and method of operating an exhaust gas recirculation (EGR) system of a vehicle includes controlling an EGR valve actuable between an EGR enabled position and an EGR disabled position, such that with the EGR valve in the EGR enabled position a portion of exhaust gas emitted from an engine is directed through an EGR cooler for recirculation into the engine, and with the EGR valve in the EGR disabled position the exhaust gas is not recirculated through the engine. An EGR coolant temperature is predicted based on measured engine speed, vehicle speed, outside ambient temperature, and commanded fuel level of the vehicle. The EGR valve is actuated to the EGR disabled position when the predicted EGR coolant temperature is equal or greater than an EGR coolant temperature threshold. The EGR coolant temperature is predicted without direct measurement of engine coolant temperature.

20 Claims, 2 Drawing Sheets

EXHAUST GAS RECIRCULATION COOLER PROTECTION SYSTEM AND METHOD

TECHNICAL FIELD

This disclosure relates to control of exhaust gas recirculation systems for engine systems.

BACKGROUND

Combustion engines, such as diesel or gasoline engines, may employ emission control systems that are configured to reduce the level of pollutants emitted from the engine. Some combustion engines utilize exhaust gas recirculation (EGR) systems for reducing nitrogen oxide (NOx) emissions. The EGR system diverts exhaust gas through a cooling mechanism, such as an EGR cooler, and recirculates the cooled engine exhaust gas back into the combustion chamber of the engine to reduce the volume of air and/or other combustible matter in the cylinder or the pre-combustion mixture. By replacing a portion of the oxygen or combustible material present during the combustion process with cooled, spent exhaust gas, EGR systems may reduce the temperatures obtained during the combustion process in the engine and thereby reduce the amount of NOx that is generated by the combustion and emitted from the engine.

Vehicle on-board diagnostics (OBD) including EGR flow diagnostics are enabled and run continuously when the engine is operating until such time a "hot lamp" is lit on the vehicle's instrument panel, indicating to the vehicle operator a hot lamp set-point has been exceeded. The hot lamp set-point typically corresponds to a hot engine coolant temperature limit, where the temperature of the coolant in the engine (the engine coolant) is measured while the engine coolant is in the engine or proximate to the engine, for example, in a thermostat housing attached to the engine, and compared to the hot engine coolant temperature limit, for example, by a controller in communication with the engine coolant temperature sensor. When the hot lamp set-point is exceeded, e.g., when the measured engine coolant temperature exceeds the hot engine coolant temperature limit, the engine controller disables EGR usage and the OBD system generates a diagnostic trouble code (DTC) which is recorded by the OBD system to indicate EGR usage has been disabled. The hot lamp set-point may correspond to a engine coolant temperature limit established based on the configuration of the engine, the type of coolant and coolant material characteristics, and other factors such as a engine coolant temperature level which has been determined to correspond to probable localized boiling of coolant in the EGR cooler, where localized boiling of the coolant in the EGR cooler may be detrimental to the EGR cooler by generating thermal excursions in the EGR cooler which can induce thermal fatigue of the cooler. The hot lamp set-point may, therefore, correspond to a hot engine coolant temperature threshold which is limited to the engine coolant temperature level corresponding to coolant boiling in the EGR cooler, where the temperature limit triggering the hot lamp is set below a maximum coolant operating temperature and/or below a maximum engine operating temperature, thereby limiting the operating engine coolant temperature range in which EGR usage may be enabled to a hot lamp set-point which is below the maximum coolant operating temperature, such that EGR usage can be disabled at a hot lamp set-point when EGR coolant boiling is probable without triggering lighting of a malfunction indicator light (MIL). Adjusting the hot lamp set-point to correspond to an engine coolant temperature limit above the engine coolant temperature level corresponding to localized boiling of coolant in the EGR cooler increases the probability of EGR damage in use, and/or requires disabling EGR usage below the hot lamp set-point to prevent localized boiling of coolant in the EGR cooler which would disable EGR related diagnostics of the OBD system at engine coolant temperatures below the hot lamp set-point.

SUMMARY

A system and method for selectively cooling and recirculating exhaust gases produced by an internal combustion engine is provided. The system and method described herein selectively disables exhaust gas recirculation (EGR) based on a predicted EGR coolant temperature, where prediction of the EGR coolant temperature is independent of a measured engine coolant temperature used to trigger the engine hot lamp indicator, such that the system and method protects the EGR cooler from thermal excursions localized in the EGR cooler. The system disables running of EGR flow diagnostics of an on-board diagnostic (OBD) system concurrent with disabling EGR based on the predicted EGR coolant temperature, and at an EGR coolant temperature threshold which may be lower than a hot coolant temperature limit corresponding to a hot lamp set-point. As used herein, the term "EGR coolant temperature" refers to the temperature of that portion of coolant ("EGR coolant") flowing through an EGR cooler of the vehicle at the point in time in reference, and the term "engine coolant temperature" refers to the temperature of that portion of coolant ("engine coolant") flowing through an engine of the vehicle at the point in time in reference.

The system and method includes operating an internal combustion engine, flowing exhaust gas produced by the engine through an air flow circuit, and circulating an engine coolant through a coolant circuit in fluid communication with an exhaust gas recirculation cooler, also referred to herein as an EGR cooler. The method includes using an algorithm to model the EGR coolant temperature and to disable EGR when a thermal excursion within the EGR cooler, such as localized boiling of coolant in the EGR cooler, is probable as determined by the algorithm, to protect the EGR cooler from thermally induced deterioration including thermal fatigue cracking of the EGR cooler structure.

The system includes an engine configured to receive intake air from an intake conduit and to output exhaust gas to an exhaust conduit. An EGR circuit including an EGR valve and an EGR cooler is in selective fluid communication with the intake conduit and the exhaust conduit such that the EGR valve is actuable to recirculate exhaust gas from the exhaust conduit to the intake conduit for recirculation through the engine, to reduce the level of nitrogen oxide (NOx) emissions produced by the engine. The EGR valve is actuable between an enabled position and a disabled position. With the EGR valve actuated to the enabled position, the EGR circuit is in fluid communication with the intake conduit and the exhaust conduit such that a portion of the exhaust gas from the exhaust conduit is recirculated through the EGR circuit, the EGR valve and the EGR cooler to the intake conduit. With the EGR valve actuated to the disabled position the exhaust gas is prevented from recirculating through the EGR circuit.

The system includes a vehicle controller configured to receive an input from each of an engine speed sensor, a vehicle speed sensor, an outside ambient temperature sensor, and a commanded fuel sensor, and to integrate the inputs received from the engine speed sensor, the vehicle speed sensor, the outside ambient temperature sensor, and the commanded fuel sensor to predict an EGR coolant temperature.

The controller is further configured to compare the predicted EGR coolant temperature to an EGR coolant temperature threshold, to actuate the EGR valve to the EGR disabled position when the predicted EGR coolant temperature is equal or greater than the EGR coolant temperature threshold, and to actuate the EGR valve to the EGR enabled position when the predicted EGR coolant temperature is less than the EGR coolant temperature threshold.

A coolant circuit configured to circulate coolant between a coolant source, the engine, and the EGR cooler, and an engine coolant temperature sensor located in the engine or proximate to the engine to sense the engine coolant temperature is included in the system. The engine coolant temperature sensor is in communication with the controller, which is configured to receive the measured engine coolant temperature from the engine coolant temperature sensor, compare the measured engine coolant temperature to a hot coolant temperature limit, and activate a hot lamp when the measured engine coolant temperature exceeds the hot coolant temperature limit. The controller predicts the EGR coolant temperature independent of the measured engine coolant temperature, e.g., the measured engine coolant temperature is not used by the controller to predict the EGR coolant temperature.

The system further includes an on-board diagnostic (OBD) system which includes EGR flow diagnostics. In the example shown, the hot coolant temperature limit is higher than the EGR coolant temperature threshold, and the system is configured such that the EGR flow diagnostics may be disabled at coolant temperatures below the hot coolant temperature limit, e.g., the EGR flow diagnostics are disabled concurrent with disabling the EGR valve when the predicted EGR coolant temperature is above the EGR coolant temperature threshold, such that EGR usage is ceased at measured engine coolant temperatures which may be below the hot engine coolant temperature limit, and, such that no malfunction indicator light (MIL) is set by disabling EGR usage at an engine coolant temperature below the hot coolant temperature limit.

A method of operating an exhaust gas recirculation (EGR) system of a vehicle is provided. The method includes controlling an EGR valve actuable between an EGR enabled position and an EGR disabled position, such that with the EGR valve in the EGR enabled position a portion of exhaust gas emitted from an engine of the vehicle is directed through an EGR cooler for recirculation into the engine, and with the EGR valve in the EGR disabled position the exhaust gas emitted from the engine is diverted from the EGR cooler such that the exhaust gas is not recirculated through the engine. The method includes predicting an EGR coolant temperature from the measured engine speed, vehicle speed, outside ambient temperature, and commanded fuel level of the vehicle and comparing the predicted EGR coolant temperature to a EGR coolant temperature threshold. The EGR valve is actuated to the EGR disabled position when the EGR coolant temperature is equal or greater than the EGR coolant temperature threshold. The EGR valve is actuated to the EGR enabled position when the EGR coolant temperature is less than the EGR coolant temperature threshold.

The above features and advantages and other features and advantages of the present invention are readily apparent from the following detailed description of the best modes for carrying out the invention when taken in connection with the accompanying drawings.

DETAILED DESCRIPTION

Figure 1:
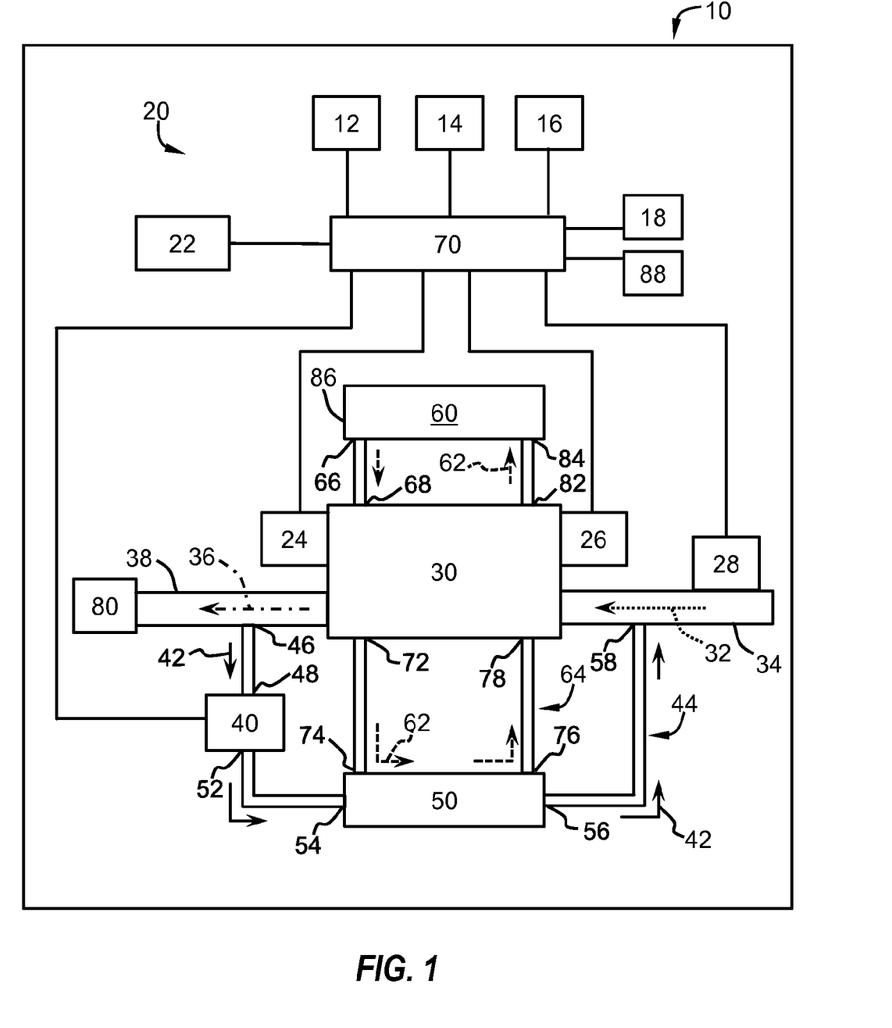
FIG. 1 is a schematic diagram of an exemplary vehicle showing an internal combustion engine in fluid communication with an exhaust gas recirculation (EGR) circuit selectively circulating exhaust gas through an EGR cooler and a coolant circuit circulating a flow of an engine coolant through the engine and EGR cooler.
Figure 2:
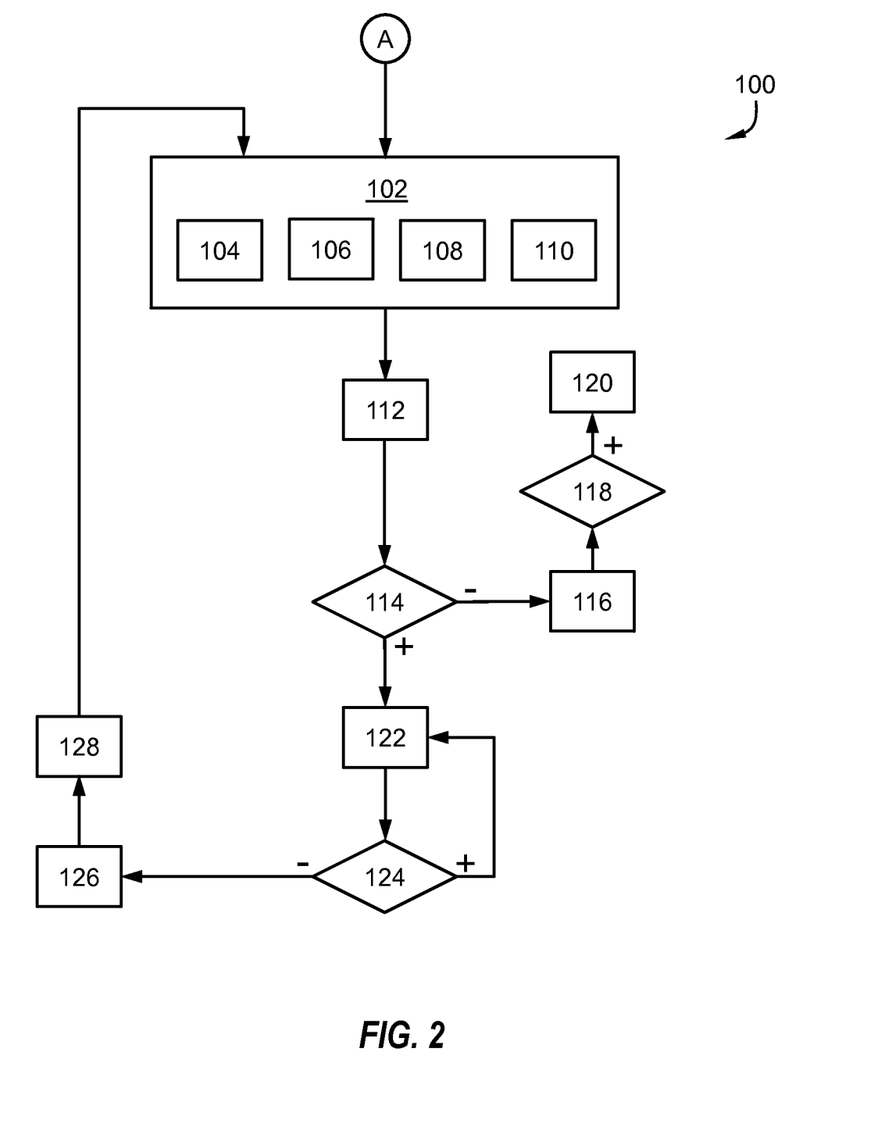
FIG. 2 is a schematic flow chart diagram of an algorithm or method for modeling the EGR coolant temperature and disabling EGR usage under certain conditions to protect the EGR cooler from thermal excursions.

Referring to the figures, like numerals indicate like parts throughout the several views. The elements shown in FIGS. 1-2 are not necessarily to scale or proportion. Accordingly, the particular dimensions and applications provided in the drawings presented herein are not to be considered limiting. Those having ordinary skill in the art will recognize that terms such as "above," "below," "upward," "downward," "top," "bottom," etc., are used descriptively for the figures, and do not represent limitations on the scope of the invention, as defined by the appended claims.

Referring to FIG. 1, a vehicle is generally indicated at 10. The vehicle 10 includes an exhaust gas recirculation (EGR) control system for selectively cooling and recirculating exhaust gases 36 produced by an internal combustion engine 30 of the vehicle 10. A method 100 for controlling EGR recirculation is shown in FIG. 2. The EGR control system 20 and method 100 described herein selectively disables exhaust gas recirculation (EGR) based on a predicted EGR coolant temperature and comparison of the predicted EGR coolant temperature to an EGR coolant temperature threshold, where prediction of the EGR coolant temperature is independent of a measured engine coolant temperature used to trigger an engine hot lamp indicator lamp 22, and such that the system 20 and method 100 protects the EGR cooler 50 from thermal excursions localized in the EGR cooler 50.

The vehicle 10 may include any type and/or style of vehicle 10, including but not limited to a hybrid vehicle 10. The vehicle 10 includes an internal combustion engine 30 and a controller 70. The internal combustion engine 30 may include but is not limited to a gasoline engine 30 or a diesel engine 30. The system includes an engine 30 configured to receive intake air 32 from an intake conduit 34 which is mixed in the engine 30 with fuel to form a combustion mixture, and to output exhaust gas 36 resultant from combustion of the combustion mixture by the engine 30 to an exhaust conduit 38. By way of example, the intake conduit 34 may include an intake manifold (not shown), and the exhaust conduit 38 may include an exhaust manifold (not shown). An intake air temperature sensor 28 in communication with the controller 70 is configured to sense the temperature of the intake air 32 entering the intake conduit 34 from outside the vehicle 10, and to output an intake air temperature signal to the controller 70. An EGR circuit 44 including an EGR valve 40 and an EGR cooler 50 is in selective fluid communication with the intake conduit 34 and the exhaust conduit 38 such that the EGR valve 40 is actuable to recirculate a portion of the exhaust gas 36 from the exhaust conduit 38 to the intake conduit 34 for recirculation through the engine 30, to reduce the level of nitrogen oxide (NOx) emissions produced by the engine 30 by replacing a portion of the oxygen of the intake air 32 and/or the combustible material present during the fuel combustion process with cooled, spent exhaust gas 36.

As shown schematically in FIG. 1, the EGR circuit 44 is fluidly connected to the exhaust conduit 38 by an EGR outlet 46, and to the intake conduit 34 by an EGR inlet 58. Exhaust gas 36 flows from the exhaust conduit 38 via the EGR outlet 46 to a valve inlet 48 of the EGR valve 40. The EGR valve 40 is actuable between an enabled position and a disabled position. With the EGR valve 40 actuated to the enabled position, the EGR circuit 44 is in fluid communication with the intake conduit 34 and the exhaust conduit 38 such that exhaust gas 36 from the exhaust conduit 38 flows through the EGR valve 40 out a valve outlet 52 to an exhaust gas inlet 54 of the EGR cooler 50 along a EGR flow path 42. The EGR circuit 44 interconnects the EGR outlet 46 and the EGR inlet 58 and provides a passageway to recirculate exhaust gas 36 recirculated from the exhaust conduit 38 to the intake conduit 34 and through the EGR cooler 50. The EGR cooler 50 is configured to cool the exhaust gas 36 as it passes through the EGR cooler 50 to an exhaust gas outlet 56. In the example shown, engine coolant 60 flows through the EGR cooler 50 as part of a coolant circuit 64 and along a coolant flow path 62, such that heat from the exhaust gas 36 flowing through the EGR cooler 50 is transferred to the coolant 60, thereby reducing the temperature of the exhaust gas 36 prior to recirculation of the exhaust gas 36 into the intake conduit 34. The cooled exhaust gas 36 flows into the intake conduit 34 via an EGR inlet 58 where the exhaust gas 36 mixes with intake air 32 for recirculation through the engine 30.

With the EGR valve 40 actuated to the disabled position, at least one of the valve inlet 48 and the valve outlet 52 are closed such that exhaust gas 36 is prevented from flowing through the EGR circuit 44, disabling EGR usage. "EGR usage," as that term is used herein, refers to recirculation of at least a portion of exhaust gases 36 exiting the engine 30 through the EGR cooler 50 to an air intake conduit 34 for recirculation through the engine 30, such that nitrogen oxide (NOx) emissions produced by the engine 30 are reduced. When EGR usage is disabled, e.g., when the EGR valve 40 is in a disabled position in the example described herein, exhaust gases 36 emitted by the engine 30 flow through the exhaust conduit 38 to an exhaust after treatment system 80 without being recirculated through the engine 30, e.g., with EGR usage disabled, substantially all of the exhaust gas 36 produced by the engine 30 during the period of time the EGR usage is disabled flows directly to the exhaust after-treatment system.

The vehicle 10 includes a coolant source 86, such as a coolant reservoir, including a coolant outlet 66 and a coolant inlet 84 in fluid communication with each other and a coolant circuit 64. The coolant circuit 64 interconnects the coolant outlet 66 and the coolant inlet 84 and defines a passageway for the engine coolant 60 to flow in a continuous loop through the engine 30 and the EGR cooler 50. In a non-limiting example shown in FIG. 1, coolant 60 flows through the coolant circuit 64 from the coolant source 86 through a coolant outlet 66, into the engine 30 through a first engine inlet 68, out of the engine 30 through a first engine outlet 72, and into the EGR cooler 50 through an inlet port 74. Coolant 60 flowing through the EGR cooler 50 exits the EGR cooler 50 at an outlet port 76 and flows through the engine 30 via a second engine inlet 78 and second engine outlet 82 to return in a continuous loop to the coolant source 86. Heat generated by the engine 30 is transferred to the coolant 60 as the coolant 60 flows through the engine 30 to cool the engine 30 during engine 30 operation, and heat generated by the exhaust gas 36 flowing through the EGR cooler 50 is transferred to the coolant 60 as the coolant 60 flows through the EGR cooler 50 to cool the exhaust gas 36 as the exhaust gas 36 flows through the EGR cooler 50. The heated coolant 60 returns to the coolant source 86 via the coolant inlet 84, where the heated coolant 60 is cooled prior to recirculation to the engine 30 via the coolant outlet 66, for example, by circulation through a radiator (not shown). As such, the temperature of the coolant 60 varies along the coolant circuit 64, such that the temperature of the coolant 60 measured at one location, for example, in the engine 30, will be different than the temperature of the coolant 60 in another location in the coolant circuit 64, for example, in the EGR cooler 50 or in the coolant source 86, where the actual temperature of the coolant 60 in these locations will vary based on coolant 60 flow rate, pressure, ambient conditions, operating conditions of the vehicle 10, coolant 60 condition and age, etc. As used herein, the term "EGR coolant temperature" refers to the temperature of that portion of coolant 60 ("EGR coolant 60") flowing through an EGR cooler 50 of the vehicle 10 at the point in time in reference, and more specifically, refers to an EGR coolant temperature which is predicted using an algorithm which integrates a combination of vehicle 10 parameters including the engine 30 speed, the vehicle 10 speed, the commanded fuel level, and the outside ambient temperature of the vehicle 10, to provide a predicted EGR coolant temperature, e.g., a prediction of the temperature of the coolant 60 in the EGR cooler 50 at the time the prediction is generated. The "commanded fuel level," as that term is used herein, refers to the driver torque demand, e.g., the fuel command request which is generated as a result of a driver input to an accelerator pedal (not shown) of the vehicle 10, requesting an engine torque level. The term "engine coolant temperature," as used herein, refers to the temperature of that portion of coolant 60 ("engine coolant") flowing through an engine 30 of the vehicle 10 at the point in time in reference, and more specifically, to a measured engine coolant temperature measured by an engine temperature sensor located on the engine 30 in contact with that portion of coolant 60 flowing through the engine 30 (the "engine coolant") or immediately proximate the engine 30, for example, in a thermostat housing (not shown) attached directly to the engine 30. Coolant 60 located in the coolant source 86, which may be a coolant reservoir and/or may be coolant 60 in a vehicle 10 radiator, may be referred to herein as "source coolant" where the source coolant temperature may be measured by a source coolant temperature sensor (not shown), such as a radiator coolant temperature sensor, located in contact with the coolant 60 (the "source coolant") contained in the coolant source 86.

The vehicle 10 includes a vehicle 10 controller 70 which is configured to actuate the EGR valve 40 between the disabled and enabled positions, for example, in response to inputs received from one or more sensors 12, 14, 16, 24 in the vehicle 10. In one example, the controller 70 may include a plurality of controllers and/or control modules in communication with each other, such that the functions of the controller 70 described herein may be performed by the controller 70 or the plurality of controllers and/or control modules. The controller 70 may include, for example, one or more of an engine control module (ECM), a powertrain control module (PCM), and an on-board diagnostic (OBD) module 18. The OBD module 18 includes EGR flow diagnostics. The controller 70 includes memory (not shown), which may include, by way of example, Read Only Memory (ROM), Random Access Memory (RAM), electrically-erasable programmable read only memory (EEPROM), etc., i.e., non-transient tangible machine memory of a configuration, size and/or speed sufficient for executing one or more algorithms included in EGR control system 20, storing one or more data bases, providing a data repository, and/or recording, by way of example, inputs from vehicle sensors 12, 14, 16, 24, 26, diagnostic data including diagnostic trouble codes (DTCs), timer 88 data including data received from an Emissions Increasing Auxiliary Emission Control Device (EI-AECD) timer 88, etc. The controller 70 may further include a central processing unit (not shown) and one or more algorithms including at least one algorithm for predicting an EGR coolant temperature, as described in further detail herein. The controller 70 including the on-board diagnostics (OBD) module 18 is configured such that the OBD module 18 and diagnostics data including DTCs and EI-AECD timer 88 data is accessible using a diagnostic scan tool (not shown) selectively connected to the controller 70, such that diagnostics data recorded to and/or stored in a vehicle 10 data base or data repository can be retrieved by the diagnostic scan tool and downloaded to the scan tool for use off-board the vehicle 10.

The system includes an engine coolant temperature sensor 26 to measure the temperature of the coolant 60 in the engine 30, e.g., to measure the engine coolant temperature. The engine coolant temperature sensor 26 is in communication with the controller 70, such that the engine coolant temperatures sensed (e.g., measured) by the engine coolant temperature sensor 26 are received by the controller 70. The controller 70 compares the measured engine coolant temperature with a hot coolant temperature limit, and triggers (lights) a hot lamp 22 when the measured engine coolant temperature exceeds the hot coolant temperature limit, to alert the vehicle 10 operator of a hot engine 30 condition. The hot coolant temperature limit is established based on the physical properties of the coolant 60 and/or operating temperature limits of the engine 30 or engine components excluding the EGR cooler 50, for the purpose of preventing thermal deterioration of and/or damage to the coolant material properties and to the engine 30 and engine components.

As described in further detail herein, the EGR system 20 via the controller 70 is configured to disable EGR usage when a predicted EGR coolant temperature exceeds an EGR coolant temperature threshold defined by a boiling curve of the EGR cooler 50, to prevent localized boiling of the coolant 60 in the EGR cooler 50 and prevent thermal deterioration of the EGR cooler 50. The controller 70 activates an Emissions Increasing Auxiliary Emission Control Device (EI-AECD) timer 88 during periods when EGR recirculation is disabled, e.g., when the EGR valve 40 is disabled such that recirculation of exhaust gas 36 through the engine 30 is prevented. In one example, the controller 70 is further configured to determine the operating engine torque as a percentage of engine torque capacity, and to confirm the engine 30 is operating at less than 75% of engine torque capacity prior to actuating the EGR valve 40 to the disabled position. Re-enablement of EGR usage, e.g., actuating the EGR valve 40 to the enabled position from the disabled position, requires that the predicted EGR coolant temperature is below the EGR coolant temperature threshold.

The condition used to disable EGR usage is based on comparison of a predicted EGR temperature with an EGR coolant temperature threshold, where the EGR coolant temperature threshold is established based on a boiling curve of the EGR cooler 50, for the purpose of preventing thermal deterioration of and/or damage to the EGR cooler 50 due to localized boiling of the coolant 60 in the EGR cooler 50 (the EGR coolant). Because EGR usage is disabled based on a predicted EGR coolant temperature which is predicted without using the measured engine coolant temperature as an input, the hot engine coolant temperature limit used to trigger the hot lamp 22 can correspond to a higher measured engine coolant temperature than the measured engine coolant temperature at which localized boiling of coolant 60 in the EGR cooler 50 would be probable with EGR enabled. As such, the EGR control system 20 defined herein provides advantages by allowing the hot lamp set-point to correspond to higher engine coolant temperatures (approaching the maximum coolant 60 operating temperature) as compared with EGR control systems 20 which derate the hot lamp set-point to correspond to a lower hot engine coolant temperature limit to prevent the probability of localized coolant 60 boiling in the EGR cooler 50, such that the EGR system 20 described herein and shown in FIGS. 1 and 2 allows EGR usage over a broader (higher) range of measured engine coolant temperatures, and selective disabling of EGR usage at engine coolant temperatures below the hot engine coolant temperature limit. The EGR control system 20 defined herein is further advantaged by allowing prediction of an EGR coolant temperature without measurement of the engine coolant temperature, and disabling of EGR usage in response to the predicted EGR coolant temperature in excess of an EGR coolant temperature threshold, such that EGR usage can be discontinued using an EGR cooler protection strategy which is independent of the measured engine coolant temperature. As such, EGR usage can be disabled to protect the EGR cooler from thermal excursions, including localized boiling of the EGR coolant in the EGR cooler, at temperatures below the hot coolant temperature limit corresponding to the hot lamp set-point. EGR diagnostics are disabled concurrently with disabling EGR usage to protect the EGR cooler 50 in response to a predicted EGR coolant temperature exceeding the EGR coolant temperature threshold. Where the EGR coolant temperature threshold is a lower temperature than the hot coolant temperature limit, the EGR diagnostics may be disabled concurrent with disabling EGR usage at an engine coolant temperature which is below the hot coolant temperature limit.

Still referring to FIG. 1, the EGR system 20 uses inputs from a combination of vehicle 10 sensors 12, 14, 16, and 24, and/or related components and/or control modules in communication with the controller 70 to determine and control EGR usage for the purpose of protecting the EGR cooler 50 from thermal excursions. Notably, neither input from the engine coolant sensor 26 or the measured engine coolant temperature is used to control EGR usage for the purpose of protecting the EGR cooler 50, e.g., EGR usage in system 10 is determined independent of the engine coolant temperature. As shown in FIG. 1, each of an outside ambient temperature sensor 12, a vehicle speed sensor 14, a commanded fuel sensor 16, and an engine speed sensor 24 are in communication with the controller 70 such that the controller 70 receives input from each of these sensors 12, 14, 16, and 24. The outside ambient temperature sensor 12 is configured to sense and output the ambient temperature outside of the vehicle 10, and may be located, for example, on an exterior surface or exterior component of the vehicle 10 such as a side view mirror (not shown). The engine speed sensor 24 is configured to sense and output the engine speed of the engine 30 to the controller 70, for example, by sensing the crank speed of the engine 30. The vehicle speed sensor 14 may include one or more sensors configured to sense the transmission output and/or wheel speed and to output this information to the controller 70 from which the vehicle speed may be determined. The commanded fuel sensor 16 may include one or more sensors configured to sense fuel command parameters and to output this information to the controller 70 from which the commanded fuel level may be determined. For example, the commanded fuel sensor 16 may sense a commanded fuel level corresponding to a driver torque request input to the vehicle accelerator pedal (not shown). The "commanded fuel level," as that term is used herein, refers to the driver torque demand, e.g., the fuel command request which is generated as a result of a driver input to an accelerator pedal (not shown) of the vehicle 10, requesting an engine torque level.

The controller 70 integrates the determined values of the engine speed, the vehicle speed, the outside ambient temperature, and the commanded fuel level, using an algorithm defined by a boiling curve of the EGR cooler 50, to predict an EGR coolant temperature. The controller 70 is further configured to compare the EGR coolant temperature to an EGR coolant temperature threshold, to actuate the EGR valve 40 to the EGR disabled position when the predicted EGR coolant temperature is equal or greater than the EGR coolant temperature threshold, and to actuate the EGR valve 40 to the EGR enabled position when the predicted EGR coolant temperature is less than the EGR coolant temperature threshold. The algorithm used by a vehicle 10 controller 70 to model the EGR coolant temperature predicts the EGR coolant temperature by integrating the engine 30 speed, the vehicle 10 speed, the outside ambient temperature, and the commanded fuel level using an integration factor defined by a boiling curve for the EGR cooler 50 and the particular coolant 60 used in the engine 30. The boiling curve is used to determine the EGR coolant temperature threshold, which corresponds to the EGR coolant temperature at which a thermal excursion within the EGR cooler 50, such as localized boiling of coolant 60 in the EGR cooler 50, is probable, to protect the EGR cooler 50 from thermally induced deterioration including thermal fatigue cracking of the EGR cooler 50 structure. The EGR coolant temperature threshold is lower than the hot engine coolant temperature limit such that the EGR flow diagnostics of the OBD system 18 are disabled concurrent with disabling EGR flow at measured engine coolant temperatures less than the hot engine coolant temperature limit.

Referring now to FIG. 2, and with continued reference to FIG. 1, there is shown a schematic flow chart diagram of an algorithm or method 100 for controlling exhaust gas recirculation (EGR) usage, for example, using the system shown in FIG. 1. The method 100 may be a portion or sub-routine of another algorithm or method 100 of the vehicle 10. For illustrative purposes, the method 100 may be described with reference to the elements and components shown and described in relation to FIG. 1 and may be executed by the controller 70 of the vehicle 10, where, as described previously, the controller 70 of the vehicle 10 may include a plurality of controllers 70 such as a PCM 70 module, ECM 70 module, diagnostics module 18, etc. Controlling EGR usage includes controlling an EGR valve 40, where the EGR valve 40 is actuable between an EGR enabled position and an EGR disabled position. EGR usage is enabled when the EGR valve 40 is in the EGR enabled position such that a portion of exhaust gas 36 emitted from an engine 30 of the vehicle 10 is directed through an EGR cooler 50 for recirculation into the engine 30 for the purpose of reducing NOx emissions produced during the combustion cycle of the engine 30. EGR usage is disabled when the EGR valve 40 is in the EGR disabled position such that the exhaust gas 36 emitted from the engine 30 is diverted from the EGR cooler 50 such that the exhaust gas 36 is not recirculated through the engine 30, e.g., such that the exhaust gas 36 is fully directed, in the example shown in FIG. 1, to an after treatment system 80 of the vehicle 10.

FIG. 2 shows a high-level diagram of the method 100. In the example shown, EGR usage is controlled in response to a comparison of a predicted EGR coolant temperature, e.g., the temperature of coolant 60 in the EGR as predicted by an algorithm, to a predetermined EGR coolant temperature threshold. In the example shown, the predicted EGR coolant temperature is continuously and concurrently evaluated when the vehicle 10 is in use. The method 100 may begin with a start or initialization step, indicated at A in FIG. 2, during which time the method 100 is monitoring operating conditions of the vehicle 10 and the EGR system 20. Initiation may occur in response to the vehicle 10 operator inserting the ignition key or otherwise initiating ignition of the vehicle 10, or in response to specific conditions being met, such as in response to engine 30 operating conditions being met as required to initiate EGR control. Alternatively, the method 100 may be running constantly or looping continuously whenever the vehicle 10 is in use.

At step 102, the controller 70 receives inputs from a plurality of vehicle 10 sensors 12, 14, 16, 24 and/or components from which the controller 70 determines the vehicle 10 speed, the outside ambient temperature of the vehicle 10, commanded fuel level, and the engine 30 speed. As shown in FIG. 2, the inputs received by the controller 70 are generated by a plurality of sensors 12, 14, 16, 24 and/or vehicle 10 components, where each sensor and/or component may be continuously monitoring a vehicle condition and outputting a signal to the controller 70. For example, at step 104 an engine speed sensor 24 is outputting an engine speed signal to the controller 70. At step 106 a commanded fuel level sensor 16 is outputting a commanded fuel signal to the controller 70. At step 108 a vehicle speed sensor 14 is outputting a vehicle speed signal to the controller 70. At step 110 an outside ambient temperature sensor 12 is outputting an outside ambient temperature signal to the controller 70. It would be understood, as described previously herein, that each "sensor" as referred to herein may include a plurality of sensors or may be a component from which an output is generated which is used by the controller 70 to determine a vehicle parameter. For example, the commanded fuel level sensor 16 may include one or more of a throttle position sensor (not shown), an output signal from a vehicle accelerator pedal (not shown), a fuel metering sensor, etc., which in combination are used by the controller 70 to determine the commanded fuel level of the vehicle 10. In another example, the vehicle speed sensor 14 may include one or more sensors configured to sense the transmission output and/or wheel speed and to output this information to the controller 70 from which the vehicle 10 speed may be determined. In another example, the controller 70 may use an intake air temperature signal received from an intake air temperature sensor 28 positioned to sense the temperature of air coming into the intake conduit 34 from outside the vehicle 10 to determine an outside ambient temperature.

At step 112, the controller 70 integrates the engine 30 speed, the vehicle 10 speed, the outside ambient temperature, and the commanded fuel level using an algorithm to predict the EGR coolant temperature, e.g., to predict the temperature of that portion of the coolant 60 located in the EGR cooler 50 (the "EGR coolant") at the time the prediction is made, where the EGR coolant 60 has been heated by transfer of heat from the EGR cooler 50 to the EGR coolant 60. It would be understood that with EGR usage enabled, the EGR cooler 50 and EGR coolant 60 would be heated by exhaust gas 36 flowing through the EGR cooler 50 during recirculation of the exhaust gas 36 from the exhaust conduit 38 to the intake air 32 conduit.

At step 114, the controller 70 compares the predicted EGR coolant temperature to a predetermined EGR coolant temperature threshold. In the example shown, the controller 70 uses an algorithm to model the EGR coolant temperature which predicts the EGR coolant temperature by integrating the engine 30 speed, the vehicle 10 speed, the outside ambient temperature, and the commanded fuel level using an integration factor defined by a boiling curve for the EGR cooler 50 and the particular coolant 60 used in the engine 30. The boiling curve is used to determine the EGR coolant temperature threshold, which corresponds to the EGR coolant temperature at which a thermal excursion within the EGR cooler 50, such as localized boiling of coolant 60 in the EGR cooler 50, is probable, to protect the EGR cooler 50 from thermally induced deterioration including thermal fatigue cracking of the EGR cooler 50 structure.

Continuing with step 114, if the predicted EGR coolant temperature is below (less than) the EGR coolant temperature threshold, the method 100 proceeds to step 116. At step 116, the controller 70 enables EGR usage by actuating the EGR valve 40 to the EGR enabled position such that a portion of exhaust gas 36 emitted from an engine 30 of the vehicle 10 is directed through an EGR cooler 50 for recirculation into the engine 30, or, if EGR usage is currently enabled, maintains the EGR valve 40 in the EGR enabled position. The method 100 returns to step 102 such that the EGR coolant temperature is again predicted based on the then current engine 30 speed, vehicle 10 speed, commanded fuel level, and outside ambient temperature by the controller 70, and compared to the EGR coolant temperature threshold. The method 100 including steps and, in the example shown, continuously loops, or alternatively, the method 100 repeats at a sampling frequency which may be a sampling frequency determined by the OBD system 18.

At step 118, the controller 70 and/or the diagnostics module 18 determines if the EI-AECD timer 88 is activated. If the EI-AECD timer 88 is activated, the controller 70 and/or the diagnostics module 18 at step 120 deactivates the EI-AECD timer 88 concurrent with enabling EGR usage.

Continuing with step 114, if the predicted EGR coolant temperature is above (higher than) the EGR coolant temperature threshold, the method 100 proceeds to step 122. At step 122, the controller 70 determines the engine torque level at which the engine 30 is currently operating, where the operating engine torque is determined and/or expressed as a percentage of the engine torque capacity, where the engine torque capacity may be a predetermined engine torque capacity, a maximum engine torque capacity, a rated engine torque capacity or a calculated engine torque capacity. The controller 70 may receive one or more inputs from one or more engine sensors (not shown) to determine the operating engine torque level. At step 124, the controller 70 compares the operating engine torque to the engine torque capacity on a percentage basis. If the operating engine torque is less than 75% of the engine torque capacity, the method 100 continues to step 126. If the operating engine torque is 75% of the engine torque capacity or greater, the method 100 returns to step 122, where controller 70 again compares the operating engine torque to the engine torque capacity. The loop between step 122 and step 124 repeats until the controller 70 detects the operating engine torque is less than 75% of the engine torque capacity, and the method 100 proceeds to step 126.

At step 126, the controller 70 disables EGR usage by actuating the EGR valve 40 to the disabled position, such that the exhaust gas 36 emitted from the engine 30 is diverted from the EGR cooler 50 and such that the exhaust gas 36 is not recirculated through the engine 30. In the example shown in FIG. 1, the exhaust gas 36 emitted from the engine 30 with the EGR valve 40 in the disabled position is fully diverted to an aftertreatment system 80, for example, for catalytic treatment of the emitted exhaust gas 36 prior to release of the exhaust gas 36 from the vehicle 10 through a tailpipe or other conduit (not shown).

At step 128, and substantially concurrent with disabling EGR usage, the controller 70 and/or the diagnostics module 18 activates an Emissions Increasing Auxiliary Emission Control Device (EI-AECD) timer 88, such that the elapsed time during which EGR usage is disabled may be measured. The time period the EI-AECD time is activated, e.g., the time period during which EGR usage is disabled, is recorded and stored to the vehicle 10 memory such that stored data is retrievable from the vehicle 10 via the controller 70 and/or the diagnostic module by an external (off-vehicle) diagnostic scan tool (not shown). The method 100 returns to step 102 such that the EGR coolant temperature is again predicted based on the then current engine speed, vehicle speed, commanded fuel level, and outside ambient temperature by the controller 70, and compared to the EGR coolant temperature threshold. The method 100 including steps and, in the example shown, continuously loops, or alternatively, the method 100 repeats at a sampling frequency which may be a sampling frequency determined by the OBD system 18.

It would be understood that modifications and variations of the present invention are possible in light of the above teachings and may be practiced otherwise than as specifically described while within the scope of the appended claims. In addition, the reference numerals in the claims are merely for convenience and are not to be read in any way as limiting.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of operating an exhaust gas recirculation (EGR) system of a vehicle, the method comprising:
   measuring an engine speed, a vehicle speed, an outside ambient temperature, and a commanded fuel level of the vehicle;
   controlling an EGR valve, wherein the EGR valve is actuable between an EGR enabled position and an EGR disabled position;
   wherein with the EGR valve in the EGR enabled position a portion of exhaust gas emitted from an engine of the vehicle is directed through an EGR cooler for recirculation into the engine;
   wherein with the EGR valve in the EGR disabled position the exhaust gas emitted from the engine is diverted from the EGR cooler such that the exhaust gas is not recirculated through the engine;
   wherein controlling the EGR valve further comprises:
   predicting an EGR coolant temperature from the measured engine speed, vehicle speed, outside ambient temperature, and commanded fuel level;
   comparing the predicted EGR coolant temperature to an EGR coolant temperature threshold; and
   actuating the EGR valve to the EGR disabled position when the predicted EGR coolant temperature is equal or greater than the EGR coolant temperature threshold.

2. The method of claim 1, further comprising:
   actuating the EGR valve to the EGR enabled position when the predicted EGR coolant temperature is less than the EGR coolant temperature threshold.

3. The method of claim 1, wherein predicting the EGR coolant temperature further comprises:
   integrating the measured engine speed, the vehicle speed, the outside ambient temperature, and the commanded fuel level using an algorithm to predict the EGR coolant temperature.

4. The method of claim 1, further comprising:
   determining an operating engine torque as a percentage of engine torque capacity; and confirming the operating engine torque is 75% or less of engine torque capacity prior to actuating the EGR valve to the disabled position.

5. The method of claim 1, further comprising:
activating an Emissions Increasing Auxiliary Emission Control Device (EI-AECD) timer concurrent with actuating the EGR valve to the disabled position.

6. The method of claim 5, further comprising:
deactivating the EI-AECD timer concurrent with actuating the EGR valve to the enabled position; and
recording the amount of time the EGR valve is in the disabled position in a vehicle memory.

7. The method of claim 1, further comprising:
circulating coolant through the EGR cooler and the engine;
measuring an engine coolant temperature of the coolant; and
predicting the EGR coolant temperature is independent of measuring an engine coolant temperature.

8. The method of claim 7, wherein a hot engine coolant temperature limit is higher than the EGR coolant temperature threshold;
the method further comprising:
disabling EGR flow diagnostics concurrent with actuating the EGR valve to a disabled position.

9. The method of claim 1, further comprising:
measuring an intake air temperature; and
estimating the outside ambient temperature from the intake air temperature.

10. The method of claim 1, wherein the EGR coolant temperature threshold is defined by a boiling curve of the EGR cooler.

11. A system for operating an exhaust gas recirculation (EGR) system of a vehicle including an engine configured to receive intake air from an intake conduit and to output exhaust gas to an exhaust conduit, the system comprising:
an EGR circuit including an EGR valve and an EGR cooler;
wherein the EGR valve is actuable between an enabled position and a disabled position;
wherein with the EGR valve actuated to the enabled position, the EGR circuit is in fluid communication with the intake conduit and the exhaust conduit such that a portion of the exhaust gas from the exhaust conduit is recirculated through the EGR circuit, the EGR valve and the EGR cooler to the intake conduit;
wherein with the EGR valve actuated to the disabled position the exhaust gas is prevented from recirculation through the EGR circuit;
a controller configured to:
receive an input from each of an engine speed sensor, a vehicle speed sensor, an outside ambient temperature sensor, and a commanded fuel sensor;
integrate the inputs received from the engine speed sensor, the vehicle speed sensor, the outside ambient temperature sensor, and the commanded fuel sensor to predict an EGR coolant temperature;
compare the predicted EGR coolant temperature to an EGR coolant temperature threshold;
actuate the EGR valve to the EGR disabled position when the predicted EGR coolant temperature is equal or greater than the EGR coolant temperature threshold; and
actuate the EGR valve to the EGR enabled position when the predicted EGR coolant temperature is less than the EGR coolant temperature threshold.

12. The system of claim 11, further comprising:
the controller configured to:
determine an operating engine torque as a percentage of engine torque capacity; and
determine the operating engine torque is less than 75% of engine torque capacity prior to actuating the EGR valve to the disabled position.

13. The system of claim 11, further comprising:
an Emissions Increasing Auxiliary Emission Control Device (EI-AECD) timer;
wherein the controller is configured to activate the EI-AECD timer concurrent with actuating the EGR valve to a disabled position, and to deactivate the EI-AECD timer concurrently with actuating the EGR valve to an enabled position.

14. The system of claim 11, further comprising:
a coolant circuit configured to circulate coolant between a coolant source, the engine, and the EGR cooler; and
the controller configured to
predict the EGR coolant temperature independent of an engine coolant temperature.

15. The system of claim 14, further comprising:
the controller configured to:
compare the engine coolant temperature to a hot engine coolant temperature limit; and
activate a hot lamp when the engine coolant temperature exceeds the hot engine coolant temperature limit.

16. The system of claim 15, further comprising:
an on-board diagnostic (OBD) system including EGR flow diagnostics; and
the EGR flow diagnostics are disabled concurrent with actuation of the EGR valve to the EGR disabled position.

17. A tangible, non-transitory computer-readable medium having instructions stored thereon that when executed by a processor perform a method for operating an exhaust gas recirculation (EGR) system of a vehicle, the method comprising:
measuring an engine speed, a vehicle speed, an outside ambient temperature, and a commanded fuel level of the vehicle;
controlling an EGR valve, wherein the EGR valve is actuable between an EGR enabled position and an EGR disabled position;
wherein with the EGR valve in the EGR enabled position a portion of exhaust gas emitted from an engine of the vehicle is directed through an EGR cooler for recirculation into the engine;
wherein with the EGR valve in the EGR disabled position the exhaust gas emitted from the engine is diverted from the EGR cooler such that the exhaust gas is not recirculated through the engine;
wherein controlling the EGR valve further comprises:
predicting an EGR coolant temperature from the measured engine speed, vehicle speed, outside ambient temperature, and commanded fuel level;
comparing the predicted EGR coolant temperature to an EGR coolant temperature threshold;
actuating the EGR valve to the EGR disabled position when the predicted EGR coolant temperature is greater than the EGR coolant temperature threshold; and
actuating the EGR valve to the EGR enabled position when the predicted EGR coolant temperature is equal to or less than the EGR coolant temperature threshold.

18. The tangible, non-transitory computer-readable medium of claim 17, wherein predicting the EGR coolant temperature further comprises:
integrating the measured engine speed, the vehicle speed, the outside ambient temperature, and the commanded fuel level using an algorithm defined by a boiling curve of the EGR cooler, to predict the EGR coolant temperature.

19. The tangible, non-transitory computer-readable medium of claim 17, the method further comprising:
activating an Emissions Increasing Auxiliary Emission control Device (EI-AECD) timer concurrent with actuating the EGR valve to the disabled position.

20. The tangible, non-transitory computer-readable medium of claim 19, the method further comprising:
deactivating the EI-AECD timer concurrent with actuating the EGR valve to the enabled position; and
recording the amount of time the EGR valve is in the disabled position in a vehicle memory.

\* \* \* \* \*